Aug. 18, 1959

G. A. TOMIK 2,899,915

DISPENSER

Filed Oct. 2, 1956

Inventor
George A. Tomik
Floyd B. Harman
Attorney

Aug. 18, 1959     G. A. TOMIK     2,899,915
DISPENSER

Filed Oct. 2, 1956                      9 Sheets-Sheet 2

Inventor
George A. Tomik
Floyd B. Harman
Attorney

Aug. 18, 1959

G. A. TOMIK 2,899,915

DISPENSER

Filed Oct. 2, 1956

Inventor
George A. Tomik
Floyd B. Harman
Attorney

Aug. 18, 1959 G. A. TOMIK 2,899,915
DISPENSER
Filed Oct. 2, 1956 9 Sheets-Sheet 4

Inventor
George A. Tomik
Floyd B. Harman
Attorney

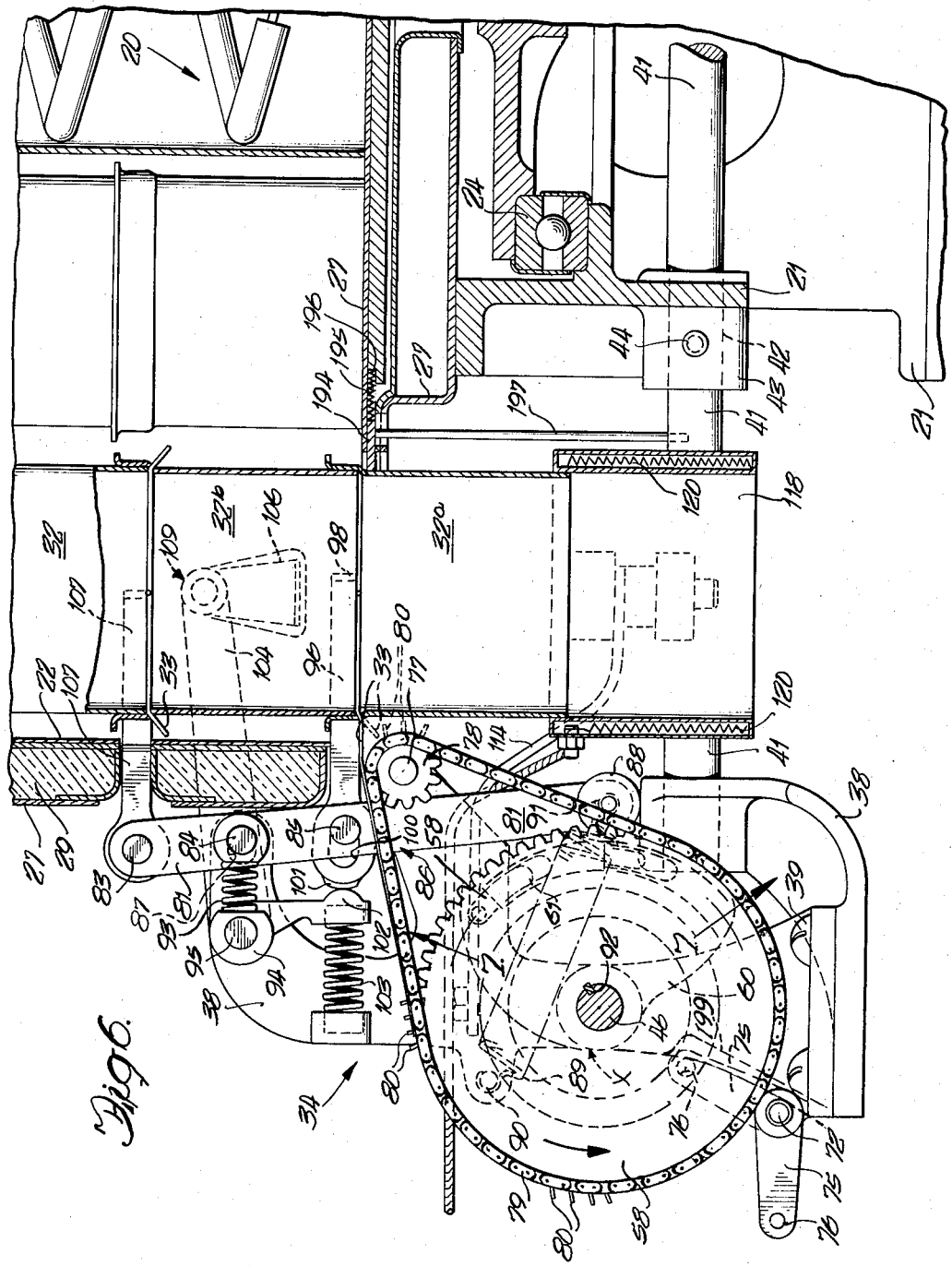

Aug. 18, 1959 G. A. TOMIK 2,899,915
DISPENSER
Filed Oct. 2, 1956 9 Sheets-Sheet 7

Inventor
George A. Tomik
Floyd B. Harman
Attorney

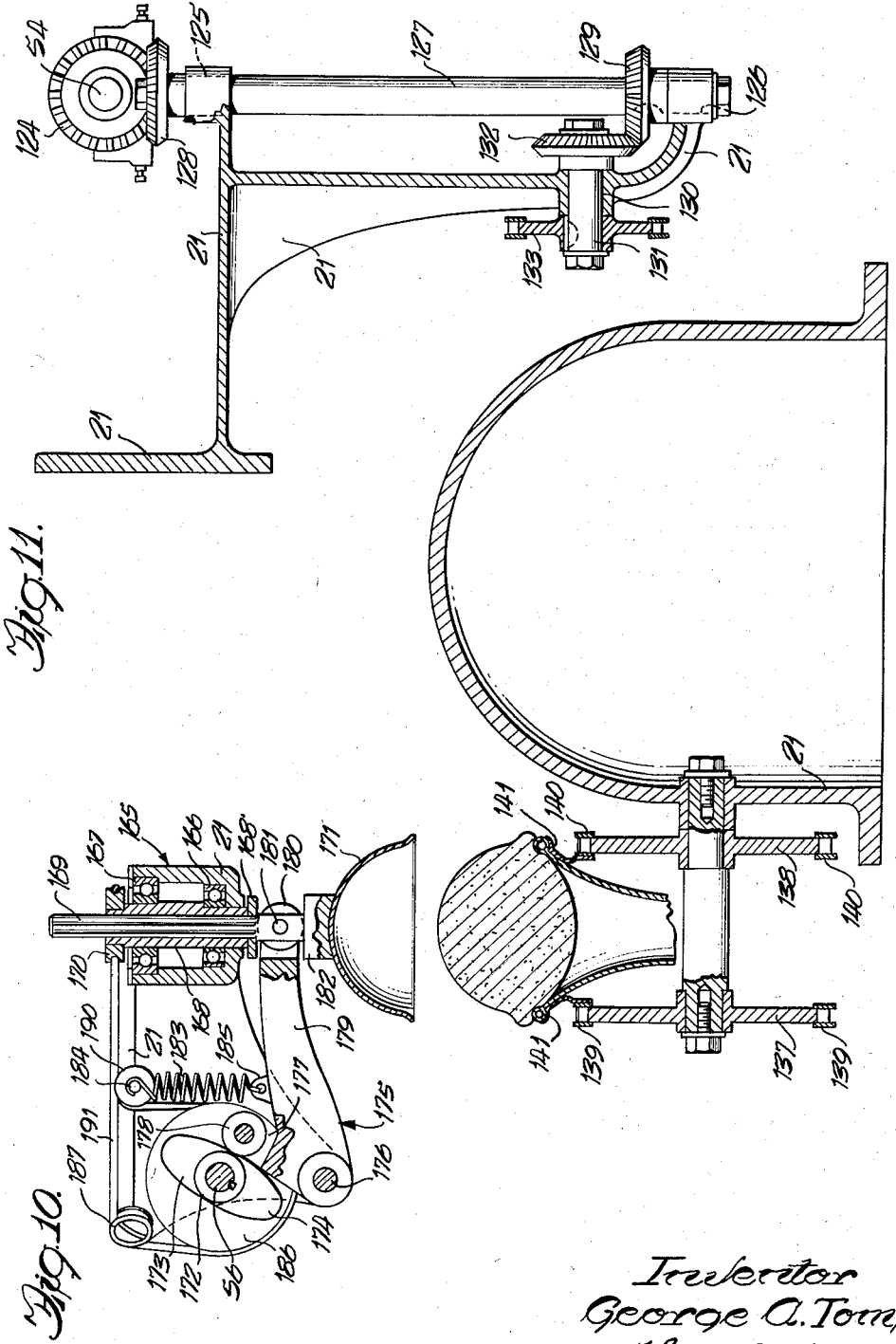

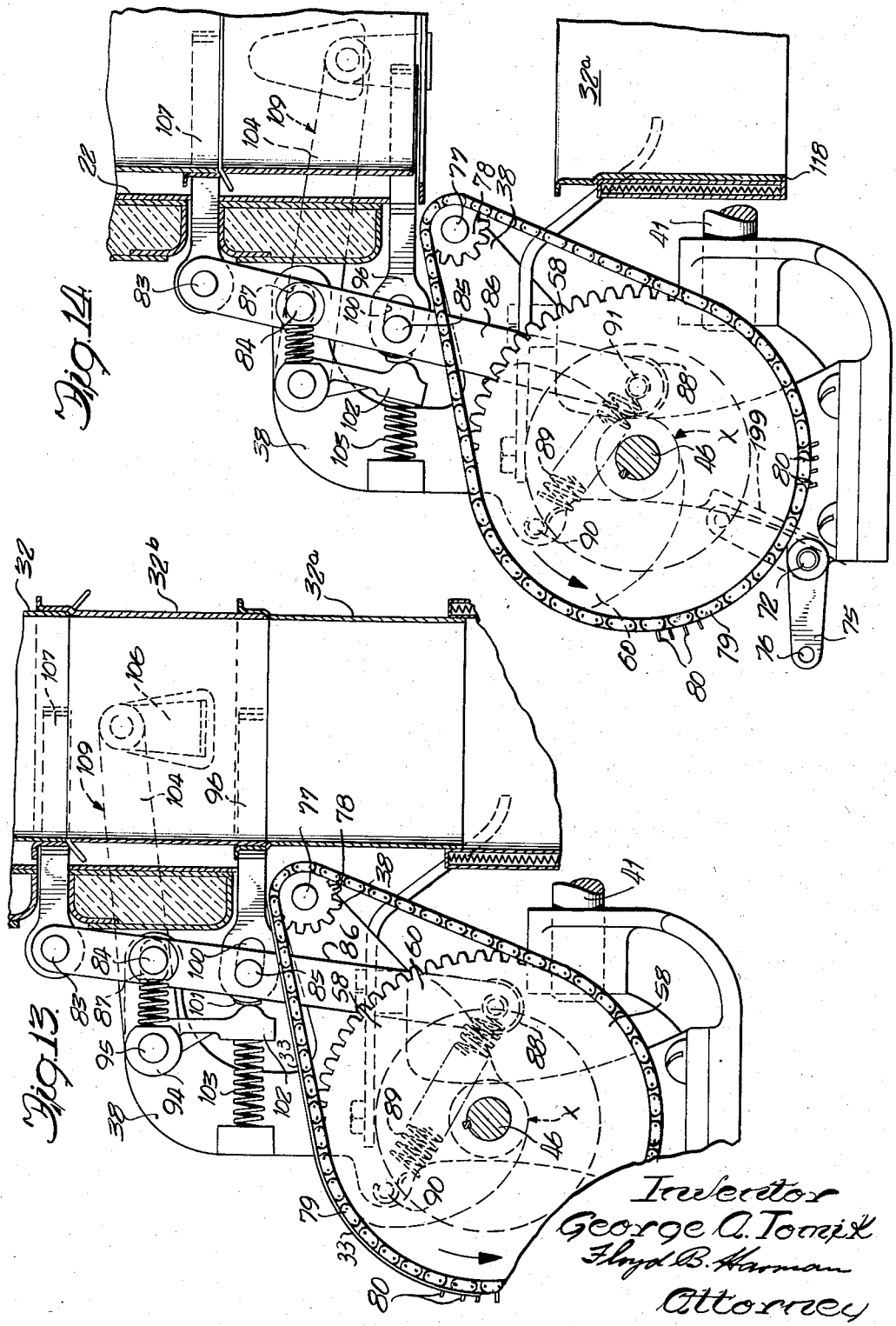

2,899,915
Patented Aug. 18, 1959

2,899,915

DISPENSER

George A. Tomik, Libertyville, Ill.

Application October 2, 1956, Serial No. 613,550

17 Claims. (Cl. 107—8)

This invention relates to a dispenser mechanism for dispensing soft semi-solid materials. More in particular this invention relates to a mechanism for dispensing semi-solid materials such as ice cream or the like contained in an open bottomed packing container of the kind described in my United States Patent No. 2,717,444, issued on September 13, 1955.

Although this invention is adapted for use in dispensing various semi-solid materials or commodities such as ice cream, cheese, custards, pastes, soaps, waxes, margarine, butter and the like, it is particularly adapted for use in dispensing ice cream. Accordingly the embodiment selected for illustrating this invention is particularly adapted to dispense ice cream in waffle type cones commonly referred as ice cream cones.

It is the general practice to serve ice cream placed in waffle cones, cups or dishes, by scooping out the ice cream from a bulk carrier with a hemispherical scoop or spoon. Normally the bulk carrier is kept in a refrigerated chest with an opening in the top that is covered with a removable lid. To serve the ice cream the lid must be removed and the ice cream scraped and scooped out by reaching into the chest and the bulk carrier. This invention eliminates the tedious labor of manual handling and reduces the time and cost of serving the ice cream.

It is the principal object of this invention to provide means for dispensing ice cream or other semi-solid materials in marketing places, hotels, resorts, schools, industrial factories, offices and places of amusement.

Another object of the invention is to provide means to insure uniform portioning and automatic dispensing of semi-solid materials.

Still another object of the invention is to provide a means for dispensing semi-solid food products such as ice cream, cheese, butter and the like in places where ordinary methods are impractical.

A still further object of this invention is to provide means for dispensing semi-solid food products hygienically free from contamination.

These and other desirable and important objects inherent in and encompassed by the invention will be more readily understood from the ensuing description, the appended claims and the annexed drawings wherein:

Figure 6 is an enlarged side elevation portion of the invention partly in section and partly broken away, similar to Figure 3, further illustrating the general arrangement of the various components thereof more in detail.

Figure 7 is an enlarged view, partly broken away and partly in section, taken along the line 7—7 of Figure 6, illustrating the details of a disk engaging detent device.

Figure 9 is an enlarged side elevation, partly broken away and partly in section, taken along the line 9—9 of Figure 3 illustrating the stripping member in detail.

Figure 10 is an enlarged side elevation, partly in section and partly broken away, taken along the line 10—10 of Figure 1 illustrating the forming device in detail.

Figure 11 is an enlarged opposite side elevation, partly in section and partly broken away, taken along the line 11—11 of Figure 1, illustrating the mounting means of the driving mechanism for a conveyor.

Figure 12 is an enlarged side elevation, partly in section, taken along the line 12—12 of Figure 4 illustrating a shaft coupling device.

Figures 13 and 14 are similar to Figure 6 except that the cam and follower for actuating the upper and lower stirrups and stripping device are illustrated in two additional stages to show the relative movement positions of the associated mechanism.

Figure 1:
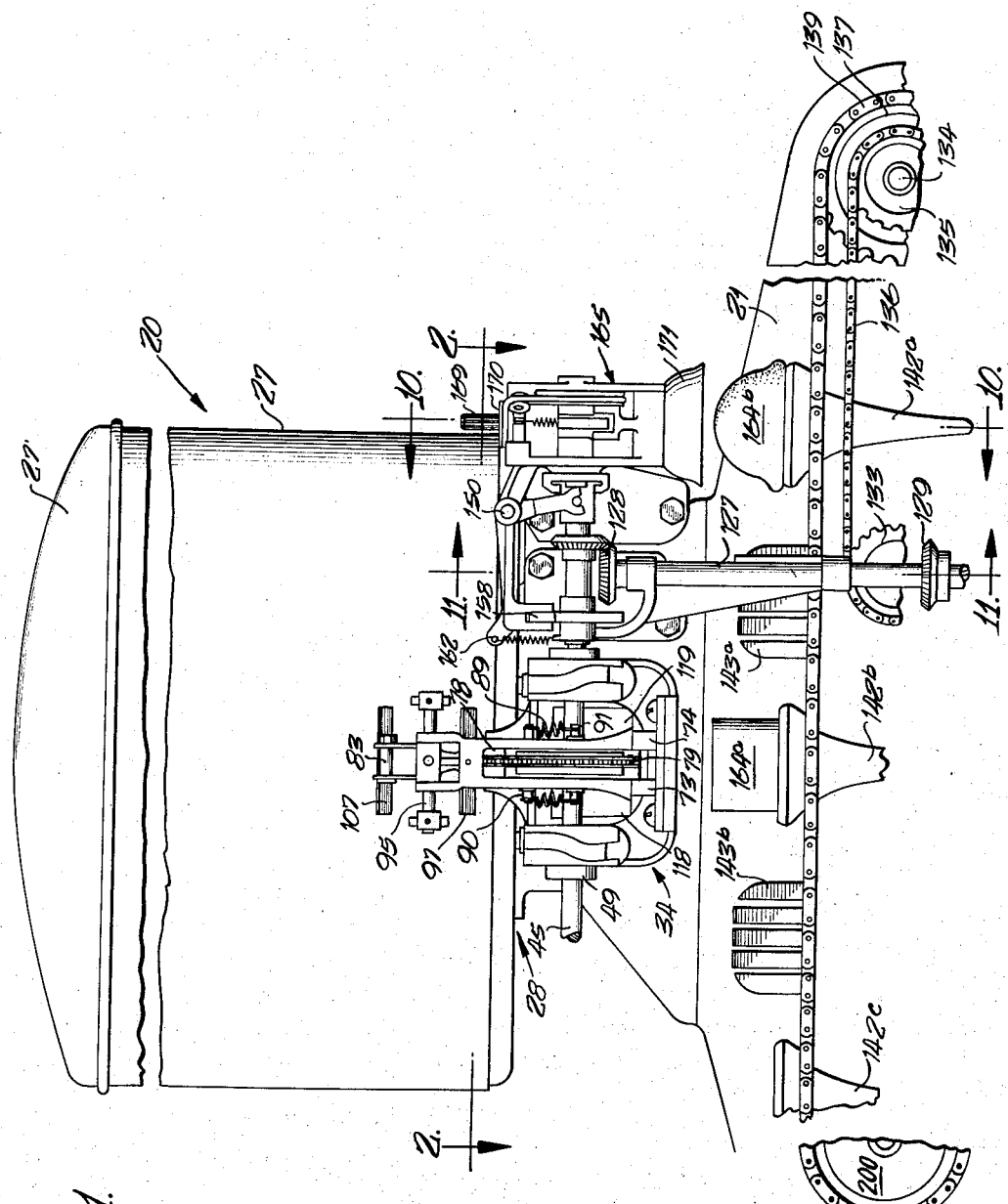
Figure 1 is a front elevation of the invention, partly broken away, illustrating the general arrangement of the various components thereof.
Figure 2:
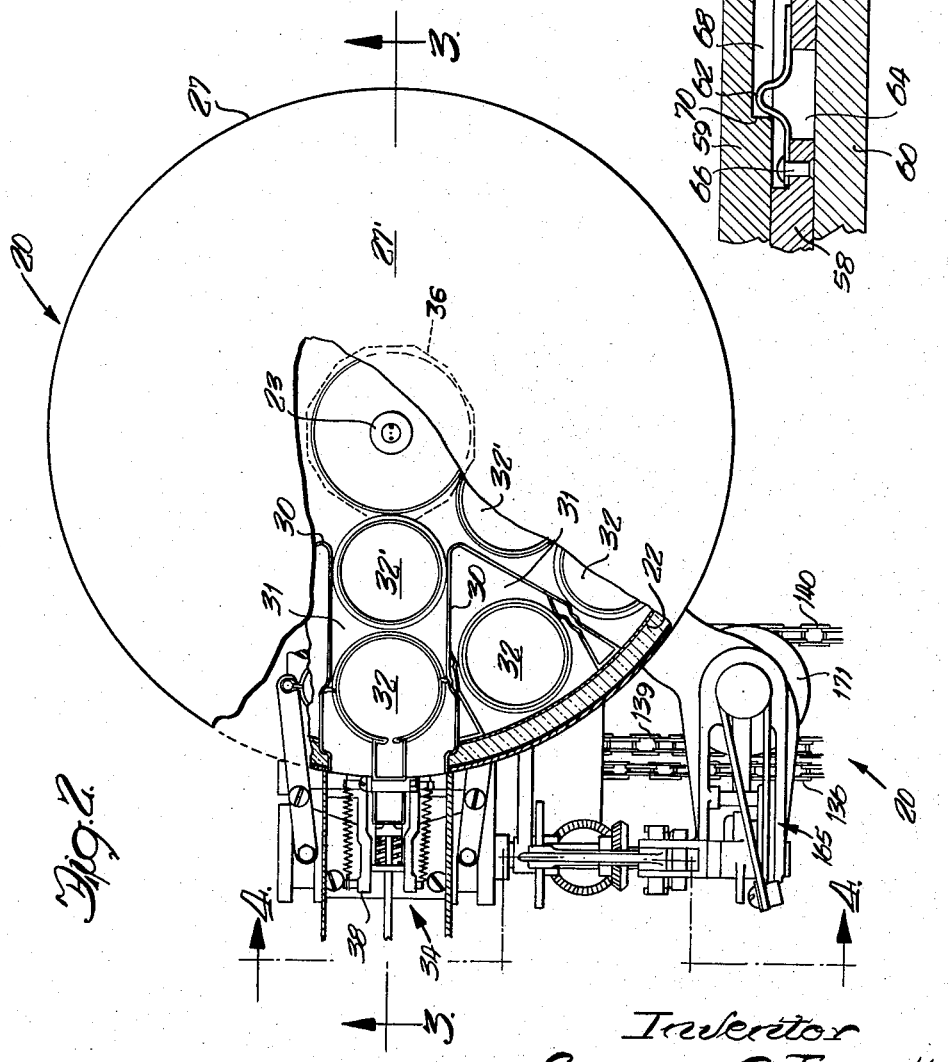
Figure 2 is a plan view of the invention, partly broken away and partly in section taken along the line 2—2 of Figure 1 further illustrating the general arrangement of the various components thereof.
Figure 3:
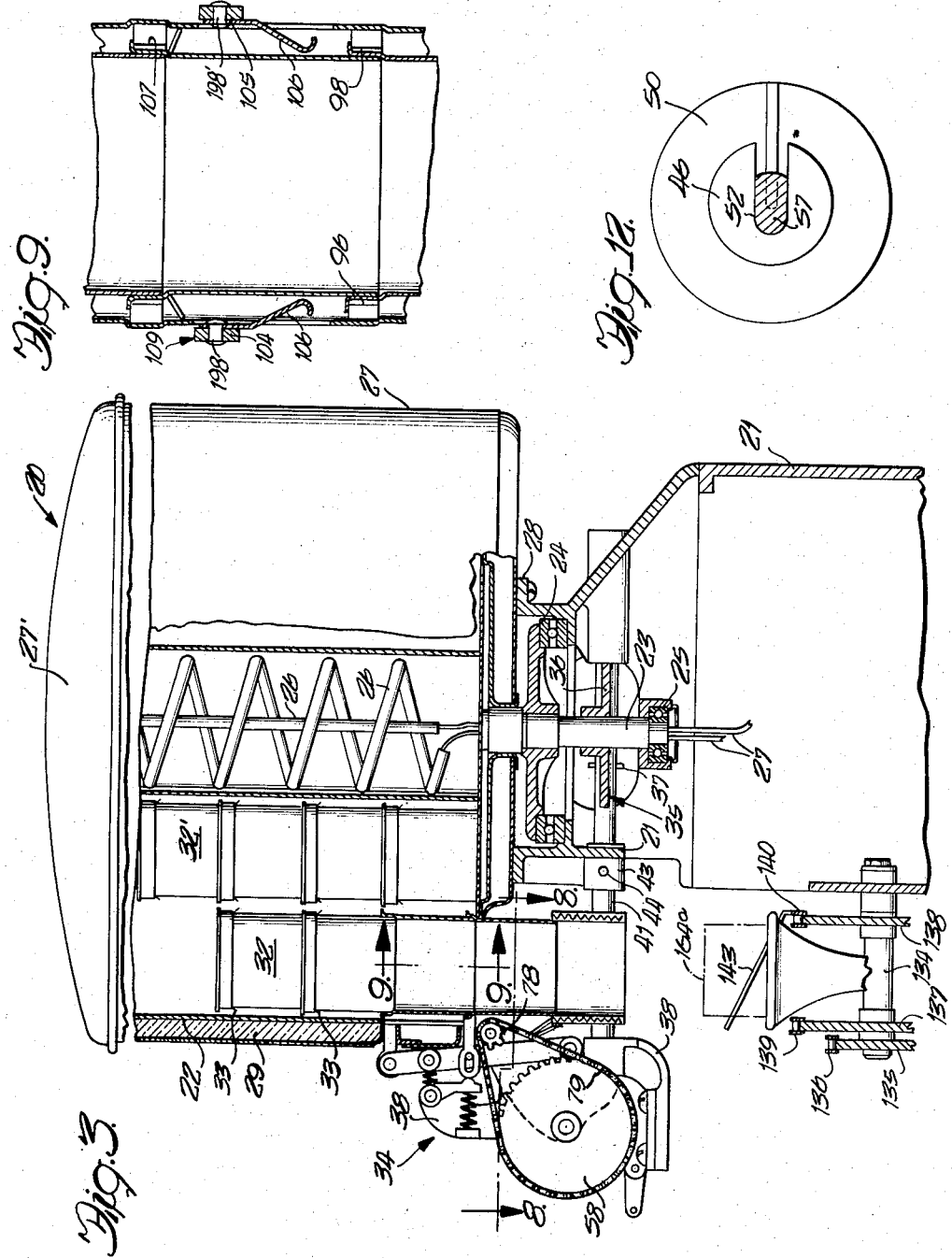
Figure 3 is a side elevation of the invention, partly broken away and partly in section taken along the line 3—3 of Figure 2, further illustrating the general arrangement of the various components thereof.

With continued reference to the drawings the numeral 20 generally indicates an ice cream cone dispenser mechanism as an embodiment of this invention. The dispenser 20 is provided with a stationary base structure 21 supporting a rotatable perforated drum or magazine 22 on a vertically disposed hollow spindle 23 journalled to axially alined anti-friction bearings 24 and 25 as best shown in Figure 3. In the central portion of the drum 22 space is provided to contain stationary refrigerant coils 26 having the leads 27 therefor passing through the hollow spindle 23 to a refrigerating compressor unit (not shown). Although the walls of the drum 22 may be heat insulated I have preferred to employ a stationary heat insulated housing 27 for the drum 22 which may be conveniently mounted on the base structure 21 at 28 as shown in Figure 1. A suitable heat insulation material 29 is disposed within the walls of the housing 27 as illustrated in Figures 2, 3, 5 and 6.

Figure 5:
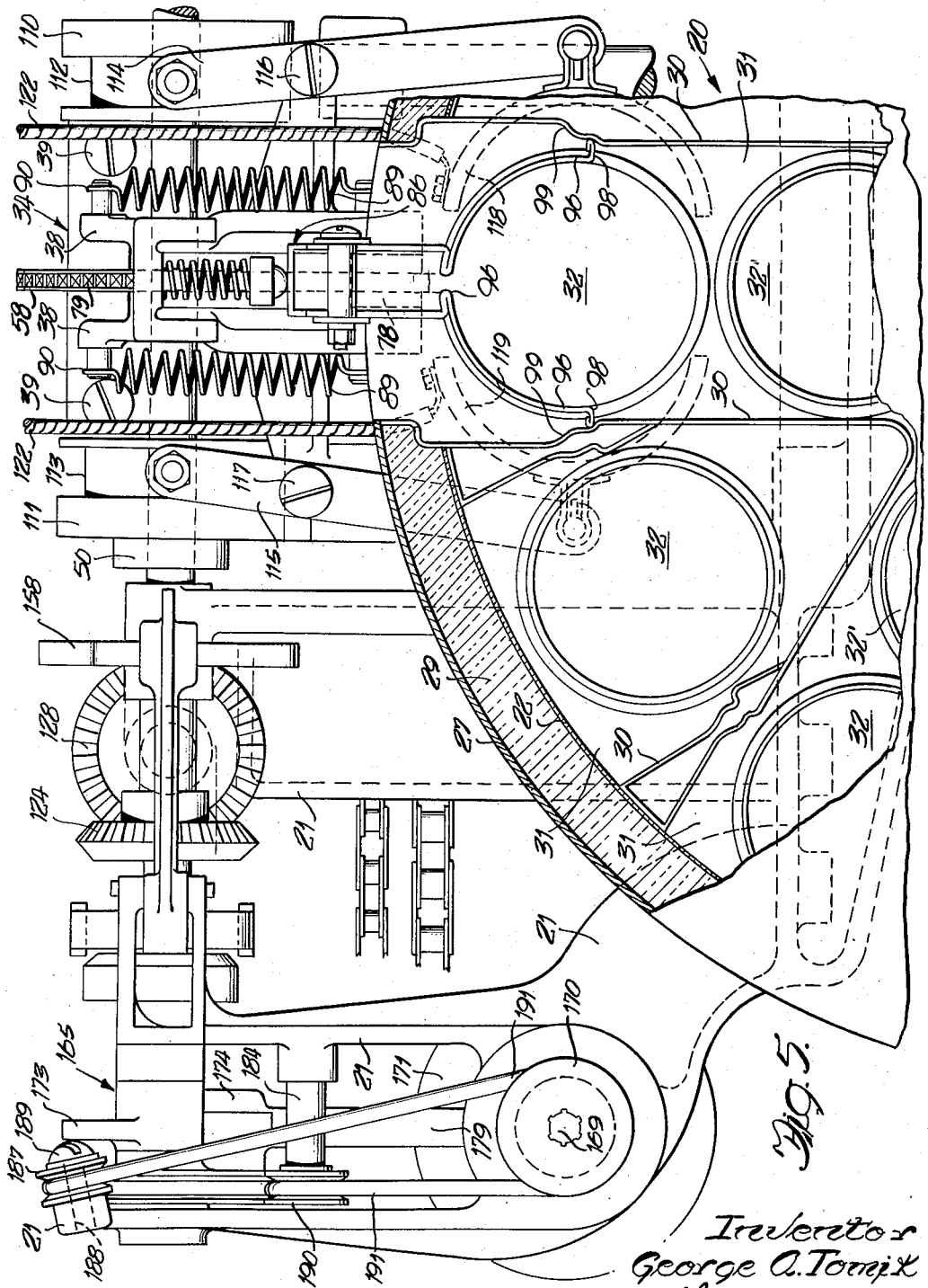
Figure 5 is an enlarged plan view portion of the invention, partly broken away and partly in section, similar to Figure 2, further illustrating the general arrangement of the various components thereof more in detail.

The drum 22 is compartmented by inserting in rigid relation a plurality of vertically disposed walls or partitions 30 forming a series of radially disposed vertically alined compartments 31 as best shown in Figure 5. Each of the various compartments 31 are adapted to support an open bottom multi-sectioned packing container, generally indicated at 32 and 32'. The containers 32 in in the outer peripheral compartments of the drum 22 are positioned for dispensing while those shown at 32' are retained in reserve or storage. Each of the containers 32 and 32' are comprised of a plurality of separable sections telescoped together to form a long tubular shaped container as more fully described in my U.S. Patent No. 2,717,444 issued on September 13, 1955. Each of the sections comprising the containers 32, 32' is provided with a transversely disposed flexible cutting element 33 positioned adjacent to the transverse plane formed by the juncture of a lower section with its adjacent upper section. For convenience the transverse plane just referred to is meant to be the plane formed by the lowest edge of the upper section such as 32b of Figure 6 when the upper section is in telescopic relation with its adjacent lower section such as 32a. Thus the cutting element 33 peripherally disposed about the inner periphery of each section of the container 32 is approximately coincidental with the above referred to transverse plane. As mentioned above the container 32 is completely disclosed and described in my above mentioned patent. From Figures 3 and 6 one of the packing containers 32 is illustrated and is positioned for dispensing individual sections thereof according to this invention.

Now it can be appreciated that in order to dispense individual sections of the packing container 32 while the container is within a compartment 31, it is necessary that some means be provided for first indexing the rotational movement of the drum 22 so that the selected compartment 31 with its associated packing container 32 is properly positioned in relation to the ejection apparatus generally indicated at 34 (Figure 6). For this purpose I provide a locking device generally indicated at 35 in Figure 3 comprising a polygon shaped disk 36 keyed to the spindle 23. The disk 36 is provided with flat edges of the same number corresponding to the number of outer peripheral compartments 31 disposed in the drum 22. A removable pin 37 is disposed in a bore (not shown) in the base structure 21 adapted to engage any of the flat edges of the disk 36 to prevent further rotational movement of the drum 22. Of couse it should be understood that other locking devices of a common variety may be employed to index the position of each compartment 31 of the drum 22 with respect to the ejection apparatus 34.

Figure 4:
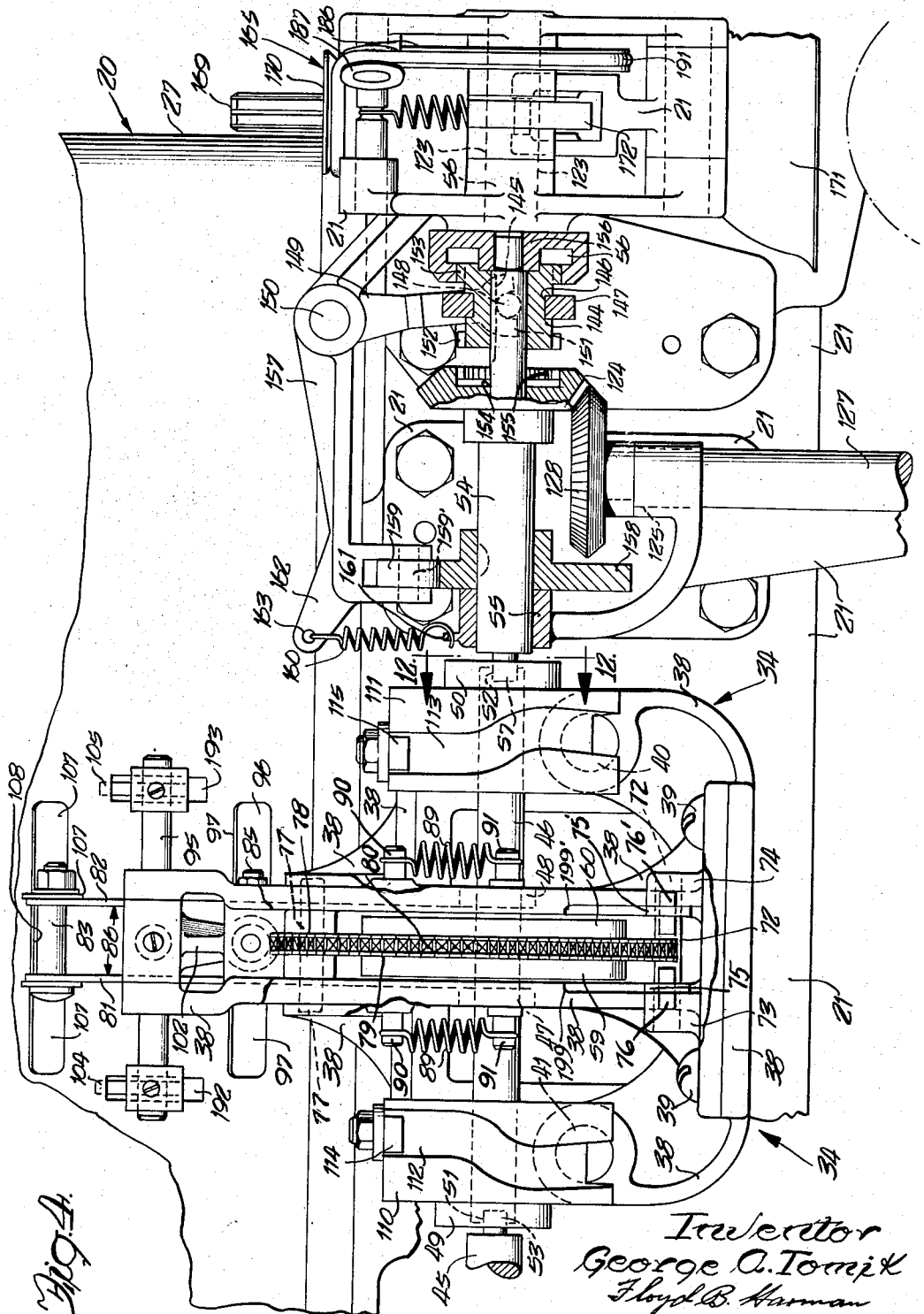
Figure 4 is an enlarged front elevation portion of the invention, partly broken away and partly in section, taken along the line 4—4 of Figure 2, further illustrating the general arrangement of the various components thereof more in detail.

The ejection apparatus 34 is mounted on a movable frame 38 which may for convenience of manufacture be comprised of several integral parts rigidly connected together such as by screws two of which are shown at 39 (Figure 4). The frame 38 includes a pair of laterally spaced horizontal dowel rods 40 and 41 as best shown in Figures 3, 4 and 6. The rods 40 and 41 are supported by the base structure 21 by bores, one of which is shown at 42 (Figures 3 and 6) in corresponding lugs, one of which is shown at 43, integrally mounted on the base structure 21. From this it may be seen that the frame 38 may be moved outwardly and away from the drum 22. However in order to position properly the ejection apparatus 34, a locking device in the form of a pin 44 extending through a small bore in the lug 43 and the rod 41 is provided. Thus when the ejection apparatus 34 is moved into operating position the pin 44 is inserted in the small bore of the lug 43 (Figures 3 and 6) to prevent further movement of the frame 38 of the ejection apparatus 34. From this it is clear that during operation of the ejection apparatus 34 the frame 38 is in a fixed rigid relation with respect to the base structure 21.

In order to prevent the packing container 32 from falling through an opening in the bottom of the housing 27 when the ejection apparatus 34 is in a withdrawn position as described above it will be seen from Figure 6 that a slidable plate 194 is positioned on the underside of the bottom of the housing 27. The plate 194 is urged outwardly by a small compression spring 195 anchored to the housing 27 at 196. For the purpose of actuating movement of the plate 194 the dowel rods 40 and 41 are provided with an upwardly extending integrally connected fingers one of which is shown at 197. The upper ends of the fingers 197 are positioned to engage the outer edges of the plate 194. Now when the ejector apparatus is withdrawn outwardly the fingers 197 on the dowel rods are also withdrawn which permits the compression spring 195 to expand thus moving the slidable plate outwardly to partly close the opening in the housing 27 beneath the packing container 32 selected for dispensing. When the ejector apparatus 34 is moved inwardly again to its operating position the fingers 197 engage the outer edge of the slidable plate 194 and move it inwardly to reestablish a complete opening in the bottom of the housing 27 as best shown in Figure 6.

The ejection apparatus 34 as shown in Figure 4 is comprised of various elements mounted on the movable frame 38 adapted in sequential operation to remove during each cycle the lowermost section of the packing container 32 by severing the material within the container 32 and forcibly ejecting downwardly the said lowermost section after first severing the material therein from the remaining upper sections.

Referring to Figure 4 a power drive mechanism (not shown) is mounted on the base structure 21 having a drive shaft a portion of which is shown at 45. The referred to power drive mechanism may be of any convenient well known design such as an electric motor and a suitable speed reducing unit such that the shaft 45 may rotate at a constant speed within a range of from about 3 to 60 revolutions per minute. Since, as will be shown later, each cycle of operation of this dispensing mechanism is associated with one full revolution of the drive shaft 45, it is preferable to employ a power drive mechanism capable of stopping the rotation of the shaft 45 in exactly the same position after one complete revolution.

A horizontally disposed drum shaft 46 (Figure 4) is journalled for rotation through the bearings 47 and 48 supported by web portions of the movable frame 38. The respective ends of the shaft 46 are provided with couplers 49 and 50 rigidly connected thereto. The couplers 49 and 50 are symmetrically constructed, the latter being illustrtated more in detail in Figure 12. The couplers 49 and 50 are provided with transversely disposed grooves 51 and 52. The shaft 45 is provided with a projection or keyed portion 53 adapted to engage the groove 51 of the coupler 49.

An extension 54 of the driven shaft 46 is journalled for rotation on the base structure 21 through the bearings 55 and the clutch member 56 and is positioned in axial alinement with the drive shaft 45. The driven shaft 54 is also provided with a projection or keyed portion 57 adapted to engage the groove 52 of the coupler 50. It should be noted that the groove 51 of the coupler 49 is in alinement with the groove 52 of the coupler 50. Thus it can be seen that if the keyed portion 53 of the drive shaft 45 is positioned horizontally, the driven shaft 46 may be moved outwardly with its associated movable frame 38 thereby disengaging the driven shaft 46 from the shafts 45 and 54.

Centrally located on the driven shaft 46 there is provided a sprocket wheel 58 keyed for rotation with the driven shaft 46 as shown at 92 of Figure 6. A pair of identical cams 59 and 60 (Figure 4) each having three stages are disposed one on each side on the shaft 46 in abutting relation with the sprocket 58 but are not keyed to the shaft 46. The cams 59 and 60 are positoned in parallel relation to each other so that they may be regarded as a single cam insofar as the same follower element is employed to engage the outer peripheral cam actuating surfaces of each as will hereinafter be further described. As mentioned above the cams 59 and 60 are not keyed to the shaft 46 but instead are engaged to the sprocket 58 by a detent device generally indicated at 61 illustrated in Figure 7. Referring now to Figures 6 and 7 it will be seen that the detent 61 is comprised of a pair of leaf or wire springs 62 and 63 anchored in recessed portions 64 and 65, respectively, of the sprocket 58 by the rivets 66 and 67 respectively. The cam 59 is provided with a corresponding recessed portion 68 and the cam 60 is provided with a corresponding recessed portion 69. Since the sprocket 58 rotates in a counter-clockwise direction as shown by the arrow in Figure 6, the leaf spring 62 engages the shoulder 70 of the recessed portion 68 thereby causing the cam 59 to rotate with the sprocket 58. Likewise the leaf spring 63 engages the shoulder 71 of the recessed portion 69 thereby causing the cam 60 to rotate with the sprocket 58. Thus in normal operating position the cams 59 and 60 rotate with the sprocket 58 in indexed relation to each other. However, for purposes later to be described the cams 59 and 60 may be locked against rotation which causes the leaf springs 69 and 70 to be forcibly depressed inwardly to disengage them from the respective shoulders 70 and 71 thus permitting the sprocket to rotate while the cams 59 and 60 are locked from rotation. When the means for locking the cams 59 and 60 is disengaged the sprocket continues to rotate until the shoulders 70 and 71 are re-alined with the leaf springs 62 and 63 respectively at which point the leaf springs 62 and 63 re-engage the shoulders 70 and 71 respectively. Thus the cams 59 and 60 again rotate with the sprocket 58 in indexed relation with each other.

Now referring to Figures 4 and 6 the means for locking against rotation the cams 59 and 60 is comprised of a small axle 72 journalled rotatably in axially alined bosses 73 and 74 integrally mounted on the movable frame 38. Integrally connected to the axle 72 in parallel spaced relation are a pair of arms 75 and 75' (Figure 4). Each of the arms 75 and 75' at the outer ends thereof is provided with projecting pins 76 and 76'. From Figures 4 and 6 it can be seen that when the axle 72 is rotated colckwise with the associated arms 75 and 75' to the position shown in the dotted lines the pins 76 and 76' engage the lobes of the cams 59 and 60 thereby locking them from further rotation. Suitable stop means such as grooves 199 and 199' in the frame 38 (Figures 4, 6 and 14) are provided for limiting the rotational movement of the axle 72 so that the arms 75 and 75' may not move beyond fixed limits with reference to the bosses 73 and 74 thereby stopping the movement of the cams 59 and 60 when their respective lobes engage the pins 76 and 76'.

Referring again to Figure 6 on the movable frame 38 is mounted another axle 77 upon which is journalled for rotation a small sprocket wheel 78 alined in the same vertical plane as that formed by the sprocket 58. The sprockets 58 and 78 are peripherally connected together by a chain 79. The chain 79 on the outer peripheral surface thereof is provided with a plurality of hook members 80 disposed in spaced relation. These hook members 80 are adapted to engage the flexible cutting elements 33 of the packing container 32 as will be further described later.

Referring now to Figures 4 and 6 the follower element generally indicated at 86 associated with the cams 59 and 60 is comprised of a pair of bars 81 and 82 rigidly connected together in parallel spaced relation by an upper pivot pin 83, a middle pivot pin 84 and a lower pivot pin 85. The pivot pins 83, 84 and 85 are rigidly connected to the bars 81 and 82 forming a rigid follower element assembly generally indicated at 86. The follower element 86 is pivotally supported by the movable frame 38 by a pair of elongated alined holes 87 in the upper bifurcated portion of the frame 38 through which the middle pin 84 passes as best shown in Figure 6. The lower end portions of the follower element 86 may be provided with pivotally mounted rollers, one of which is shown at 88, which are alined for engagement with the actuating lobes of the cams 59 and 60 to minimize contact friction between the cams 59 and 60 and the follower element 86. Now in order to maintain contact between the follower element 86 and the actuating lobes of the cams 59 and 60, one end of each of a pair of helical springs 89 under tension is anchored at 90 to the movable frame 38 and the other end connected to the lower end of the follower element 86 at 91. Thus it may be readily seen that as the cams 59 and 60 rotate on the driven shaft 46 the motion imparted to the rollers 88 of the follower element 86 is in the nature of an arcuate path.

Now in order to urge inwardly toward the drum 22 the upper portion of the bars 81 and 82 of the follower element 86 a helical spring 93 under compression is anchored to the follower element 86 adjacent the middle pin 84 while the other end of the spring 93 is anchored to a rock arm 94 as shown in Figure 6. The arm 94 is rotatably connected to the movable frame 38 by a rock shaft 95 journalled to the frame 38. Thus the spring 93 urges the follower element 86 inwardly toward the drum 22 which movement is limited by the elongated holes 87 in the frame 38.

Referring now to Figures 4, 5 and 6 it will be seen that on the middle portion of the follower element 86 there is pivotally mounted on the lower pivot pin 85 a lower stirrup 96 which projects from the pin 85 through an aperture 97 in both the drum 22 and the housing 27. The lower stirrup 96 is constructed of spring type material such as spring steel so that upon contraction of the stirrup as illustrated in Figure 5 it will grip the packing container 32 securely. The extreme inner ends 98 are formed for engagement with the walls 30 of any of the compartments 31 of the drum 22. From Figure 5 it will be seen that the walls 30 of the compartments 31 are provided with curved surfaces 99 adapted to engage the inner ends 98 of the lower stirrup 96. The curved surfaces 99 of the walls 30 are so formed that when the lower stirrup 96 is moved inwardly it causes contraction of the lower stirrup 96 and, conversely, when moved outwardly causes expansion of the lower stirrup 96. Thus when the lower stirrup 96 is moved inwardly it contracts to seize the container 32 and when moved outwardly it expands to release the container 32. It will be noted that the connection of the lower stirrup 96 to the lower pivot pin 85 is in the form of an elongated hole 100 shown in Figure 6. Now in order to urge the lower stirrup 96 inwardly it will be seen from Figure 6 that the outer end of the lower stirrup 96 is provided with an abutting surface 101 which is in abutting relation with the depending leg 102 of the rock arm 94. The leg 102 of the arm 94 is urged inwardly by a helical spring 103 anchored on one end to the lower end of the leg 102 and the other end anchored to the movable frame 38. The relative movement of the lower stirrup 96 with respect to the follower element 86 is limited by the elongated hole 100 in the lower stirrup 96.

As best viewed in Figures 4, 6 and 9 each end of the rock arm 94 is provided with substantially horizontal legs 104 and 105, respectively, which extend through corresponding apertures 192 and 193 in the casing 27 and drum 22 into compartment 31. The inner ends of the legs 104 and 105 are each provided with a downwardly depending separator element 106 respectively pivotally connected to the legs 104 and 105 at 198 and 198' as best shown in Figure 9. The rock shaft 95 with the rock arm 94 including the legs 102, 104 and 105 with the separator elements 106 comprise the stripping member of this invention generally indicated at 109 and its function will be described later. It is suffice to state at this point that a lateral or arcuate movement of the leg 102 against the spring 103 results in an arcuate up or down motion of the separator elements 106.

Referring now to Figures 4 and 6 it will be seen that on the upper pivot pin 83 supported by the bars 81 and 82 of the follower element 86 is an upper stirrup 107 which is constructed similar to the lower stirrup 96 except that its pivotal connection to the upper pivot pin 83 is not of the elongated hole type such as the elongated hole 100 of the lower stirrup 96. The upper stirrup extends through corresponding apertures 108 of the housing 27 and drum 22 and moves horizontally and when moved inwardly it contracts to grip the packing container 32 due to the inner ends thereof engaging the curved surfaces 99 of the walls 30 of a compartment 31 in the drum 22. Conversely when the upper stirrup 107 is moved outwardly it expands to release the packing container 32 similarly as that described previously for the lower stirrup 96. The construction of the upper stirrup is of resilient material such as spring steel as is the previously described lower stirrup 96.

From the foregoing it can be seen that when the roller 88 of the follower element 86 is riding on the high dwell of the cams 59 and 60 as shown in Figure 6, the upper stirrup 107 is in an expanded position to release its grip of the packing container 32 because it has been moved to its outward limit by the follower element 86. At the same time the middle pivot pin 84 is held to the inward side of the elongated holes 87 on the frame 38 by the action of the compression spring 93. The lower stirrup 96 is in its innermost position by the action of the lower pivot pin 85 thereby sustaining the lower stirrup 96 in a contracted position to grip the packing container 32. The stripping member, generally indicated at 109, is in a raised position because the abutting surface 101 is at its extreme inward limit thereby allowing the compression spring 103 to move the legs 102 and 104 of the stripping member 109 in a counterclockwise direction.

Now referring to Figures 13 and 14 it will be seen that as the roller 88 of the follower element 86 moves outwardly from the high stage dwell (Figure 6) to the intermediate stage dwell (Figure 13) pivoting of the follower element 86 is about the middle pivot pin 84. Movement of the roller 88 from the high stage dwell of the cams 59 and 60 first causes the upper stirrup 107 to move inwardly to its innermost limit thereby contracting to grip the packing container 32 as explained previously. Meanwhile the lower pivot pin 85 of the follower element 86 has moved outwardly and has just reached engagement with the outer edge of the elongated hole 100 but has not yet begun to move outwardly the lower stirrup 96 so that the lower stirrup 96 is still contracted to grip the packing container 32. Now as the cams 59 and 60 rotate further to move the roller 88 of the follower element 86 from the intermediate stage to the low dwell stage of the cams 59 and 60, the pivot point of the follower element 86 shifts from the middle pivot pin 84 to the upper pivot pin 83. This shifting of the pivot point from the pin 84 to the pin 83 is due to the fact that the upper stirrup 107 has reached its inward movement limit. Now since the pivoting of the follower element 86 has shifted from the pin 84 to the pin 83 the roller 88 moves on to the low dwell stage of the cams 59 and 60 as illustrated in Figure 14 wherein it will be seen that the lower stirrup 96 has been moved outwardly by the action of the lower pivot pin 85 engaging the outermost edges of the elongated hole 100 of the lower stirrup 96. Thus the lower stirrup 96 becomes expanded thereby releasing its grip on the packing container 32. Simultaneously with the outward movement of the lower stirrup 96 the abutting surface 101 moves the legs 102, 104 and 105 of the stripping member 109 in a clockwise direction against the compression of the spring 103 thus the stripping member 109 moves downwardly. Further rotation of the cams 59 and 60 will of course reverse the movements just described until the position shown in Figure 6 is again established.

Figures 8, 15:
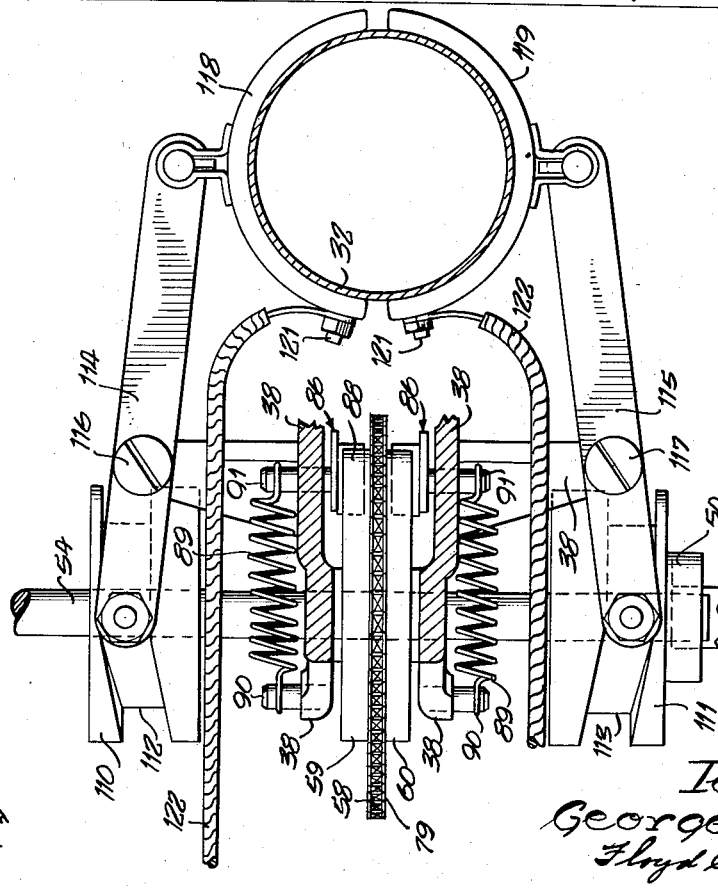
Figure 8 is an enlarged plan view, partly broken away and partly in section taken along the line 8—8 of Figure 3 illustrating in detail the clam shells and its associated mounting and operating mechanism.
Figure 15 is a chart illustrating the sequence of operation of the various components for one complete cycle dispensing one ice cream cone according to this invention.

Now referring to Figures 4, 6 and 8 there is provided a pair of symmetrical two stage cams 110 and 111 keyed to the driven shaft 46. The grooves 112 and 113 respectively of the cams 110 and 111 provide motion imparting means to a pair of follower elements 114 and 115 respectively engaged therewith. The follower elements 114 and 115 are supported by the movable frame 38 pivotally at 116 and 117 respectively as shown in Figure 8. The innermost end of the follower element 114 is connected to a gripping element or clam shell 118. The clam shell 118 is in the form of a vertical section of a cylinder or tube. Likewise the follower element 115 at its innermost end is connected to a clam shell 119 symmetrically in shape to that of the clam shell 118. From Figures 4 and 8 it can be appreciated that when the shaft 46 rotates with the cams 110 and 111 the respective follower elements 114 and 115 riding in the grooves 112 and 113 respectively causes the clam shells 118 and 119 to alternately open and close. In Figure 8 the clam shells 118 and 119 are in closed position so as to grip a section of the packing container 32. When opened as shown in dotted lines in Figure 5 it releases its grip on the section of the packing container 32 as will be discussed later. It should be pointed out however that the grooves 112 and 113 of the cams 110 and 111 causes the clam shells to complete one cycle during a single revolution of the shaft 46.

Now in order to provide means for causing the discharge of the material contained in the multi-sectioned packing container, as each section successively drops into the closed clam shells 118 and 119 as will be explained more in detail later, the interior walls of each of the clam shells 118 and 119 are provided with electric heating elements or coils 120 as best shown in Figure 6. The terminals 121 shown best in Figure 8 are associated electrically with the heating coils 120 and are connected to a source of electric energy through the wire conductors or leads 122. Thus when electric energy is provided to the leads 122 the heating coils 120 of the clam shells 118 and 119 the clam shells become heated and when a section such as 32a (Figure 6) of the packing container 32 drops into the closed clam shells the heat passing through the walls of the section such as 32a causes the material adjacent to the wall within the section 32a to soften or melt so that adherence is lost and the material drops downwardly out of the section 32a, thereby emptying the section 32a of its contents.

At this point it can be appreciated that by first removing the pin 44 from the lug 43 the entire ejection apparatus 34 may be moved outwardly on the dowel rods 40 and 41 thereby disengaging the shaft 46 from the shafts 45 and 54 to retract the upper stirrup 107, the lower stirrup 96, the stripping member 109, the sprocket chain 79 and the clam shells 118 and 119 all being mounted on the movable frame 38 away or outwardly from the rotatable drum 22 and its associated housing 27. Means are now described for receiving and disposing separately the material discharged from the individual sections of the packing container 32 and the emptied sections.

As shown in Figure 4 on the base structure 21 there is mounted a bearing 55 supporting rotatably one end portion of the shaft 54. The other end of the shaft 54 is of reduced diameter and is supported rotatably by the clutch member 56. The clutch member 56 is journalled for rotation in a bore 123 of the base structure 21. Journalled for rotation on the shaft 54 is mounted a bevel drive gear 124. As best shown in Figures 4 and 11 the base structure 21 is provided with axially alined bores 125 and 126 adapted to support rotatably a vertically disposed conveyor shaft 127. Keyed to the upper end of the conveyor shaft 127 in driving relation is a first bevel driven gear 128 in meshed relation with the gear 124. Adjacent the lower portion of the conveyor shaft 127 in driving relation is a second bevel driven gear 129. Mounted rotatably in a horizontal bore 130 in the base structure 21 is a pinion shaft 131 as best illustrated in Figure 11. On one end of the pinion shaft 131 in driven relation is mounted a third bevel driven gear 132 in meshed relation with the gear 129. On the other or inner end of the pinion shaft 131 is mounted in driven relation a small sprocket wheel 133 shown in Figures 1 and 11.

Referring now to Figures 1 and 3 mounted rotatably on the base structure 21 is a horizontally disposed stub shaft 134. Adjacent the outer end portion of the stub shaft 134 in alinement with the sprocket wheel 133 is a driven sprocket wheel 135. The sprocket 135 is keyed to the stub shaft 134 in driving relation. An endless sprocket chain 136 as shown in Figure 1 connects the sprocket wheels 133 and 135 in driving relation with each other. Keyed to the stub shaft 134 are mounted a pair of conveyor sprocket wheels 137 and 138 respectively in parallel spaced relation. Riding on the sprocket wheels 137 and 138 in parallel spaced relation are a pair of endless conveyor chains 139 and 140 as best shown in Figures 1, 3 and 10. A second pair of sprocket wheels, one of which is partly shown at 200 in Figure 1, similar to the wheels 137 and 138 are mounted on the base structure 21 in corresponding alinement to receive and support substantially horizontal the conveyor chains 139 and 140. As best shown in Figures 1 and 10 along the conveyor chains 139 and 140 spaced at convenient intervals are metal receiving rings 141 adapted to support a disk, cup or cone or other receptacle such as waffle type ice cream cones 142a, 142b and 142c. The rings are connected to opposite links of the conveyor chains 139 and 140 so that the rings move in unison with the conveyor chains 139 and 140. It should also be stated that the rings 141 on the conveyor chains 139 and 140 are adapted for positioning directly beneath the clam shells 118 and 119 as illustrated best in Figures 1 and 8. Also for purpose of deflecting an emptied section such as 32a of the packing container 32 after release by the clam shells 118 and 119 the conveyor chain 140 is provided with a series of inclined plates 143a and 143b each being integrally connected to at least one link thereof and spaced at intervals between the receiving rings 141 as shown in Figures 3–10.

Referring now to Figure 4 it will be seen that between the bevel drive gear 124 and the clutch member 56 is a clutch sleeve member 144 which is splined to shaft 54 at 145. Thus the sleeve member 144 rotates with the shaft 54 but may be displaced in an axial direction. The central portion of the sleeve 144 is provided with an annular groove 146 supporting an annular collar 147. The collar 147 is provided with a pair of annular projections one of which is shown in dotted lines at 148. The collar 147 is prevented from rotating with the sleeve member 144 by a yoke 149 pivotally supported at 150 to the base structure 21. The yoke 149 is provided with a forked portion on each side, one of which is shown in dotted lines at 151, which engage the two annular projections 148 so that longitudinal movement of the forked members 151 causes the annular collar 147 to move the sleeve member 144 axially. The outer peripheral portions of the sleeve member 144 are provided with teeth 152 and 153. Corresponding to the teeth 152 on the sleeve member 144 there is provided a recessed portion 154 in the gear 124 having peripheral teeth 155 which are adapted to receive and engage the teeth 152 of the sleeve member 144. Thus from Figure 4 it can be seen that a clockwise movement of the yoke 149 about its pivot 150 causes axial movement of the sleeve member 144 whereby the teeth 152 thereof engage in meshed relation the teeth 155 of the gear 124 thereby engaging the shaft 54 in driving relation with the gear 124. The clutch member 56 is also provided with a recessed portion 156 having inner peripheral teeth engageable with the teeth 153 of the sleeve member 144. Thus a counterclockwise movement of the yoke 149 about its pivot 150 causes engagement of the teeth 153 with the clutch member 56 whereby the clutch member 56 is in driven relation with the shaft 54. From the foregoing it should be appreciated either the gear 124 or the clutch member 56 may alternately be engaged for driving relation with the shaft 54 depending upon the position of the yoke 149 on its pivot 150. As shown in Figure 4 the clutch member 56 is drivingly engaged with the shaft 54 while the gear 124 is disengaged from driving relation with the shaft 54.

In order to actuate the yoke 149 for engaging alternately the gear 124 or the clutch member 56 with the shaft 54 the yoke 149 is provided with a rock arm or cam follower element 157 as shown in Figure 4. On the shaft 54 adjacent the bearing 55 is a two-stage cam 158 the actuating surface being on the outer peripheral edge thereof. The cam 158 is keyed for rotation with the shaft 54. The end portion of the rock arm 157 is bifurcated having a cam engaging roller 159 pivotally connected to shaft 159' therethrough as shown in dotted lines of Figure 4. The roller 159 of the rock arm or follower element 157 is urged downwardly to engage the actuating surface of the cam 158 by a helical spring 160 anchored on one end to the bearing 55 at 161 and the other end to an ear 162 of the rock arm 157 at 163. Thus as the cam 158 rotates with the shaft 54 the high dwell thereof causes engagement of the shaft 54 in driving relation with the gear 124 while the low dwell of the cam 158 causes engagement of the clutch member 56 in driving relation with the shaft 54.

It will be observed from Figure 1 that the material 164a as discharged from a section of the packing container 32 to the receptacle or cone 142b is in the form of a solid cylinder. Particularly in the case of dispensing ice cream cones it is traditional to form the ice cream into a shape resembling a solid hemisphere such as that illustrated at 164b. In order to convert the cylindrically shaped ice cream 164a to that of a hemispherical shape as shown at 164b a forming device generally indicated at 165 is provided the construtcion of which is now to be described.

Referring to Figures 4, 5 and 10 it will be seen that the base structure 21 is provided with a pair of bearings 166 and 167 in vertical spaced relation as shown best in Figure 10. The bearings 166 and 167 support rotatably a vertically disposed hollow shaft 168. The inner wall of the hollow shaft 168 is splined to receive in axially slidable relation a splined spindle 169. On the upper end of the hollow shaft 168 is mounted in driving relation a driven pulley 170. On the lower end of the hollow shaft 168 is an integrally connected washer 168'. On the lower end of the splined spindle 169 is mounted in driven relation a substantially hemispherically shaped forming element 171 as best shown in Figure 10. Referring to Figures 4 and 10 a cam 172 having two actuating lobes 173 and 174 disposed at 180° apart is mounted and keyed for rotation on the clutch member 56. A cam follower element generally indicated at 175 is pivotally mounted on the base structure 21 at 176. One leg 177 of the follower element 175 is provided with a roller 178 positioned for engagement with the actuating surfaces of the lobes 173 and 174 of the cam 172. The other leg 179 of the follower element 175 projects inwardly as shown in Figure 10. The inner end of the leg 179 is bifurcated to provide vertical clearance for the splined spindle 169. The bifurcated portion of the leg 179 is provided with stub shafts one of which is shown at 181. Pivotally carried by the stub shafts 181 are a pair of rollers in spaced relation one of which is shown at 180. From Figure 10 it will be seen that the rollers 180 are positioned for alternate engagement with the washer 168' of the hollow shaft 168 or the hub 182 of the forming element 171. Thus the arcuate movement of the leg 179 transmits vertical linear movement to the splined spindle 169.

The roller 178 of the follower element 175 is urged into engagement with the actuating surfaces of the lobes 173 and 174 of cam 172 by means of a helical spring 183 anchored at the upper end to a horizontal rod 184 mounted on the base structure 21 and at the lower end to an ear 185 projection of the leg 179 of the follower element 175.

Also mounted on the clutch member 56 in driving relation is a large pulley 186. An angularly disposed guide pulley 187 is mounted for rotation on an ear portion of the base structure 21 as best shown in Figures 5 and 10. The pivot supporting means for the pulley 187 may be accomplished by providing a threaded bore 188 in the base structure adapted to receive threadedly a screw 189 the shank of which supports rotatably the pulley 187. A second guide pulley 190 is rotatably mounted on the horizontal rod 184 as best illustrated in Figures 5 and 10. An endless elastic belt 191 is disposed on the outer peripheral surfaces of the pulleys 170, 186, 187 and 190 as shown in Figure 10 whereby on rotation of the clutch member 56 the splined spindle 169 and its associated forming element 171 is drivingly caused to rotate. From the above it can be seen that upon rotation of the clutch member 56 the splined spindle 169 and the forming element 171 rotates and simultaneously the cam 172 is actuated to cause alternately up and down movement of the splined spindle 169 with the forming element 171.

*Operation*

First the perforated rotatable drum must be charged or loaded with one or more packing containers 32 each filled with, as an example, ice cream. The locking pin 44 on the lug 43 (Figure 6) of the base structure 21 is withdrawn. The couplers 49 and 50 (Figure 4) are positioned for disengaging the driven shaft 46 from the drive shaft 45 and the shaft 54. The entire ejection apparatus 34 is moved outwardly on the dowel rods 40 and 41. This movement of the ejection device 34 withdraws the upper stirrup 107, the stripping member 109, the lower stirrup 96, the clam shells 118 and 119 and the sprocket chain 79 with its associated hook members 80 through the corresponding apertures in the drum 22 and housing 27 completely away and apart from the drum 22. This outward movement of the ejection 34 device allows the plate 194 to move outwardly which partly closes the bottom front opening in the housing 27 to prevent the falling therethrough of a packing container 32 when inserted as explained previously. The cover 27' is then removed from the stationary drum housing or casing 27. One or more of the packing containers 32 as described in my United States Patent No. 2,717,444 each filled with ice cream (or other material) are placed with the bottom ends open, one in each compartment 31 of the drum 22. Referring to Figure 3 the pin 37 is removed and the drum 22 rotated to position a selected compartment 31 for reception of the ejection apparatus 34. The pin is then inserted in the locking device 35 to prevent further rotation of the drum 22. The ejection device 34 is then moved inwardly on the dowel rods 40 and 41 whereby the upper stirrup 107, the stripping member 109, the lower stirrup 96, the clam shells 118 and 119 and the sprocket chain 79 with its associated hook members 80 are inserted through corresponding apertures in the housing 27 and drum 22 to the selected compartment 31 as shown in Figure 6. The fingers 197 also engage the slidable plate 194 to again reestablish the bottom front opening of the housing 27 immediately below the container 32 selected for dispensing as explained previously. The pin 44 is then inserted on the lug 43 to prevent lateral movement of the ejection apparatus 34. The dispensing mechanism of this invention is now ready to dispense the ice cream or other material in the packing container 32 within the selected compartment 31 of the drum 22. The metal receiving rings 141 of the conveyor chains 139 and 140 are each provided with a cone or other receptacle 142.

At this point it should be borne in mind that one complete revolution of the drive shaft (Figure 1) 45 is a complete cycle of the mechanism whereby the lowest section 32a (Figure 6) is separated from the remaining upper sections of the container 32, removes the ice cream from the section 32a and discharges same in a receptacle on the conveyor as illustrated in Figure 1. During the cycle the emptied section 32a is also disposed of by the mechanism.

Reference is made to the chart shown as Figure 15 which illustrates the sequence of operations comprising a complete cycle of this dispensing mechanism. It will be appreciated that in order to maintain the illustrated sequence of operations the actuating surfaces of the various cams described must be positioned in a definite order with respect to one another. At the start of the cycle the drive shaft 45 is at 0° and the cams 59 and 60 are positioned so that the rollers 88 of the follower element 86 is in contact with the low dwell or first stage of the actuating surfaces of the cams 59 and 60 at the point X indicated in Figures 6, 13 and 14. From Figure 14 it can be seen that when the rollers 88 of the follower element 86 is in the first stage with respect to the cams 59 and 60 the lower stirrup 96 is disengaged from the container 32, the stripping member 109 is in a downward position, the upper stirrup 107 is in engagement with the upper flanged portion of the section 32b of the container 32.

At the 0° position of the drive shaft 45 the hook members 80 on the sprocket chain 79 are at some distance from the flexible cutting element 33 of the section 32a of the container 32 and therefore at this position there is no severing of the ice cream in the section 32a from that in the above adjacent section 32b.

At the 0° position of the drive shaft 45 the actuating surfaces of the cams 110 and 111 are positioned for maintaining the clam shells 118 and 119 in a closed or contracted position. Also at the 0° position of the drive shaft 45 the high dwell of the actuating surface of the cam 158 engages the roller 159 of the follower element 157 for engaging the gear 124 in driving relation with the shaft 54 thereby connecting the conveyor sprocket chains 139 and 140 (Figures 1 and 10) in drive relation.

When the drive shaft 45 has rotated through an angular displacement of approximately 50° the inclined plate 143a (Figure 1) on the moving conveyor chains 139 and 140 will have reached a position directly beneath the heated clam shells 118 and 119. Simultaneously the cams 110 and 111 will at this point actuate the follower elements 114 and 115 thereby opening the heated clam shells 118 and 119. Now from the previous cycle of operation of the dispensing mechanism there would up to this point have been an emptied section of the container 32 supported by the clam shells 118 and 119 which upon expansion of the shells 118 and 119 allows the empty section to be expelled downwardly striking the inclined plate 143a. The inclination of the plate 143a causes the falling empty section of the container 32 to deflect its path of travel laterally into an appropriately positioned waste basket (not shown) thus disposing the expelled emptied section.

Now as the drive shaft 45 continues to rotate and as it reaches an angular displacement of about 70° the cams 59 and 60 with respect to the rollers 88 of the follower element will enter the second or intermediate stage of the actuating surfaces of the cams 59 and 60. At this point the lower stirrup 96 is moved inwardly to contract thereby engaging the upper flange of the section 32a of the container 32. Simultaneously with the inward movement of the lower stirrup 96 the abutting surface 101 of the stirrup 96 also moves inwardly thus allowing expansion of the spring 103 to urge the stripping member 109 upwardly from the position shown in Figure 14 to the position shown in Figure 13. It will be noted that at this point both the upper stirrup 107 and the lower stirrup 96 are in engaged relation with the container 32 as illustrated in Figure 13.

Now as the drive shaft 45 reaches an angular displacement of approximately 80° the sprocket wheel 58 (Figure 6) will have moved the chain 79 into position for engaging one of the hook members 80 with a projecting loop of the flexible cutting element 33 of the section 32a of the container 32. Since at this point the flexible element 33 commences to be withdrawn the severing of the ice cream in the section 32a from the ice cream in the section 32b of the container 32 also commences.

As the drive shaft 45 further progresses to an angular displacement of about 115° the high dwell or the third stage of the actuating surfaces of the cams 59 and 60 engage the rollers 88 of the follower element 86 pivoting on the middle pin 84 (Figure 6) moves the upper stirrup 107 outwardly thereby expanding the stirrup 107 and releasing its engagement with the upper flange of the section 32b of the container 32.

When the drive shaft 45 reaches an angular displacement of about 140° the low dwell of the cam 158 (Figure 4) comes into engagement with the roller 159 of the follower element 157 which in turn causes axial shifting of clutch sleeve member 144 to disengage driving relation to the bevel gear 124 thereby halting the movement of the conveyor chains 139 and 140 and simultaneously engaging in drive relation the clutch member 56 to actuate the forming device 165. At this point the waffle cone 142b (Figure 1) in its corresponding receiving ring 141 on the conveyor chains 139 and 140 will have reached and come to rest directly beneath the clam shells 118 and 119. Now also at this position the preceding cone 142a in its corresponding receiving ring on the conveyor chains 139 and 140 will have come to rest directly beneath the forming element 171 of the forming device 165. Now the ice cream on the cone 142a is in the cylindrical form illustrated at 164a but was discharged during the immediate preceding cycle of operation of the dispensing mechanism. Since as pointed out above the forming device is now actuated the forming element 171 rotating on its vertical axis moves downwardly to transform the shape of the ice cream from the cylindrical shape illustrated to the traditional hemispherical form shown at 164b. It will be recalled from the previous description and Figure 10 that the roller 178 engages alternately one of the lobes 173 or 174 of the cam 172 to cause a downward movement of the forming element 171 and then return to the position shown in Figure 10 while simultaneously rotating the element 171 by movement of the pulleys 170 and 186 through the elastic belt 191.

Now as the drive shaft 45 progresses to an angular displacement of about 235° the rollers 88 of the follower element 86 re-enters the second or intermediate stage position with reference to the actuating surfaces of the cams 59 and 60 as illustrated in Figure 13. At about this point the sprocket 58 with the chain 79 will have moved sufficiently so that the hook member 80 has completely withdrawn the flexible cutting element 33 from the section 32a of the container 32 thereby completing the severance of the ice cream in the section 32a from that in the section 32b. Subsequent movement of the sprocket 58 in a counter-clockwise direction allows the withdrawn flexible element 33 to drop downwardly by gravity as it is drawn outwardly about the periphery of the sprocket 58 and its associated chain 79 (Figure 13) by the engaging hook member 80, the point of separation being at some distance from the conveyor chains 139 and 140 as evident from Figures 3 and 6. At the same time the cams 59 and 60 have caused the shifting of the follower element 86 back to the second stage resulting in the re-engagement of the upper stirrup 107 to the upper flange of the section 32b.

When the drive shaft 45 reaches an angular displacement of about 250° the actuating surfaces of the cams 110 and 111 causes movement of the corresponding follower elements 114 and 115 to close or contract the heated clam shells 118 and 119 from the position shown in dotted lines in Figure 5 to the position illustrated in Figure 8. Thus the clam shells are readied for receiving the section 32a of the container 32.

As the drive shaft 45 progresses to an angular displacement of 270° the rollers 88 of the follower element 86 again reaches the low dwell or first stage of the actuating surfaces of the cams 59 and 60 as shown in Figure 14. This shifting of the follower element 86 about the upper pivot pin 83 causes an outward movement of the lower stirrup 96 which allows it to expand and thereby release its engagement with the section 32a. Simultaneously the outward movement of the lower stirrup 96 causes the abutting surface 101 to actuate the stripping member 109 in a downward direction. This downward movement of the stripping member 109 causes the separator elements 106 (Figure 9) thereof to engage the upper flange of the section 32a of the container 32. Since the ice cream in the section 32a has been severed from that in the section 32b as explained previously, the downward movement of the stripping member 109 forcibly separates the entire section 32a from the section 32b. The separated section 32a then drops completely into the closed heated clam shells 118 and 119 as illustrated in dotted lines of Figure 14 with the ice cream therewithin.

While the drive shaft 45 continues to rotate further the heat from the heated clam shells 118 and 119 penetrates through the cylindrical walls of the section 32a of the container 32 which heat melts the ice cream adjacent to the inner wall thereof. This melting action causes parting of the ice cream within the section 32a which allows the frozen cream in substantially cylindrical shape to drop vertically into the cone 142b on the idle conveyor chains 139 and 140 as shown at 164a of Figure 1.

When the drive shaft has progressed to an angular displacement of about 320° the high dwell of the cam 158 (Figure 4) engages the roller 159 of the follower element 157 which in turn shifts the clutch sleeve member 144 toward the left thereby re-engaging the bevel gear 124 for starting the motion of the conveyor chains 139 and 140 and simultaneously disengaging the driving connection to the forming device 165. Progressive movement of the drive shaft 45 to an angular displacement of 360° to the starting point (0°) causes no further action of the mechanism except that of the movement of the conveyor chains 139 and 140.

It will be noted that during one complete revolution of the drive shaft 45 the bevel gear 124 associated with the conveyor chains 139 and 140 move but one-half of a revolution and likewise the clutch member 56 of the forming device 165 moves but one-half of a revolution. Thus it becomes necessary to provide the cam 172 (Figure 10) of the forming device 165 with two lobes 173 and 174 each of which is engaged with the roller 178 during alternate cycles.

Now if the dispensing mechanism is operated in a second cycle when the drive shaft 45 again reaches an angular displacement of about 115° the upper stirrup 107 expands which allows the section 32b (Figure 6) and all sections thereabove of the container 32 to drop downwardly whereby the section 32b then occupies the position of section 32a of Figure 6. Upon progress of the second cycle the ice cream in section 32b will be discharged into the cone 142c moved into position shown as 142b in Figure 1. The cone with the ice cream from the first cycle will then have reached the position shown at 142a. Therefore the ice cream discharged during the first cycle will be formed into a hemispherical shape as shown at 164b (Figure 1) during the second cycle.

The operation of the dispensing mechanism of this invention as described above is adapted for continuous delivery. Should it however become necessary to deliver a single ice cream cone, the first cycle is permitted to operate completely as described. This operation will deliver one cylindrically shaped ice cream mass 164a to the cone 142b. Before the second stage is started the arms (Figures 4, 14 and 6) 75 and 75' are moved to the position shown in dotted lines so that the projecting pins 76 and 76' engage the lobes of the cams 59 and 60. This causes the suspension of the motion of the cams 59 and 60 through the action of the detent device 61 of Figure 7. Since the cams 59 and 60 are thus immobilized the follower element 86 is also immobilized thus preventing the operation of the stirrups 96 and 107 and the stripping member 109. Thus a subsequent section of the container 32 will not be separated and deposited in the clam shells 118 and 119 during the second cycle but yet allows the conveyor chains 139 and 140 and the forming device 165 to operate normally.

Having thus described a preferred embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. A dispenser mechanism for dispensing material of semi-solid consistency contained in a multi-sectional packing container having a transversely disposed flexible cutting element positioned adjacent each of the transverse planes formed by the junctures of said sections comprising a base structure, a rotatable drum mounted on said base structure with its axis vertically disposed, said drum being compartmented and positioned to support vertically at least one of said containers, means supported by said base structure for engaging one of said cutting elements for severing said material in said container while supporting said container, means supported by said base structure for separating a lower section of said container with said severed material therein while supporting the remaining upper sections of said container, and heated means for receiving said separated section of said container for discharging the severed material therefrom and subsequently expelling said separated section of said container.

2. A dispenser mechanism for dispensing material of semi-solid consistency contained in a multi-sectioned packing container having a transversely disposed flexible cutting element positioned adjacent each of the transverse planes formed by the junctures of said sections comprising a base structure, a rotatable drum mounted on said base structure with its axis vertically disposed, said drum being compartmented and positioned to support vertically at least one of said containers, means supported by said base structure for engaging one of said cutting elements for severing said material in said container while supporting said container, means supported by said base structure for separating a lower section of said container with said severed material therein while supporting the remaining upper sections of said container, a pair of heated clam shells associated with said drum contracted to receive and support temporarily said separated section of said container with said severed material therein, said heated clam shells causing discharge of said material from said separated section of said container by reducing adherence of said material, a conveyor having at least one receptacle positioned under said drum for receiving and removing said discharged material, and means for expanding said clam shells for expelling said separated section of said container after said conveyor and receptacle has received and removed said severed material therefrom.

3. A dispenser mechanism for dispensing material of semi-solid consistency contained in a multi-sectioned packing container having a transversely disposed flexible cutting element positioned adjacent each of the transverse planes formed by the junctures of said sections comprising a base structure, a rotatable drum mounted on said structure with its rotational axis vertically disposed, said drum being compartmented and positioned to support vertically at least one of said containers, a movable frame mounted on said base structure, upper and lower stirrups mounted on said frame positioned to engage and support at least one section of said container, a movable hook member mounted on said frame adapted to engage one of said flexible cutting elements for severing said material in said container, a stripping member mounted on said frame positioned to separate a lower section of said container with said severed material therein from the remaining sections of said container thereabove, a contractable expandable means mounted on said frame positioned to receive and support temporarily said separated lower section of said container with said severed material therein, said contractable expandable means being adapted to discharge said material from said separated lower section of said container and subsequently expelling said separated section, and conveyor means mounted on said base structure positioned for receiving and removing said discharged material.

4. A dispenser mechanism for dispensing material of a semi-solid consistency contained in a multi-sectioned packing container having a transversely disposed flexible cutting element positioned adjacent each of the transverse planes formed by the junctures of said sections comprising a base structure, a rotatable drum mounted on said structure with its rotational axis vertically disposed, said drum being compartmented and positioned to support vertically at least one of said containers, a movable frame mounted on said base structure, upper and lower releasable stirrups mounted on said frame positioned to engage and support at least one section of said container, a movable hook member mounted on said frame adapted to engage the flexible cutting element associated with the lowest section of said container for severing said material, a stripping member mounted on said frame and positioned between said stirrups to separate forcibly said lowest section of said container with said severed material therein from the remaining sections of said container thereabove, a contractable expandable means mounted on said frame positioned to receive and support temporarily said separated lowest section of said container with said severed material therein, said contractable expandable means being adapted to discharge said material from said separated lowest section of said container and subsequently expelling said separated lowest section, and means mounted on said base structure for receiving and removing said discharged material.

5. A dispenser mechanism for dispensing material of a semi-solid consistency contained in a multi-sectioned packing container having a transversely disposed flexible cutting element positioned adjacent each of the transverse planes formed by the junctures of said sections comprising a base structure, a rotatable drum mounted on said structure with its rotational axis vertically disposed, said drum being compartmented and positioned to support vertically at least one of said containers, a laterally movable frame mounted on said base structure, upper and lower stirrups mounted on said frame projecting into said drum positioned to engage and support at least one section of said containers, a movable hook member mounted on said frame adapted to enter said drum to engage the flexible cutting element associated with the lowest section of said container for severing said material, a stripping member mounted on said frame and positioned between said stirrups to separate forcibly said lowest section of said container with said severed material therein from the remaining sections of said container thereabove, a pair of contractable expandable clam shells mounted on said frame and extending under a portion of said drum, said clam shells being positioned to receive and support temporarily said separated lowest section of said container with said severed material therein, said clam shells being adapted to discharge said material from said separated lowest section of said container and subsequently expelling said separated lowest section, and means mounted on said base structure for receiving and removing said discharged material.

6. A dispenser mechanism for dispensing material of a semi-solid consistency contained in a multi-sectioned packing container having a transversely disposed flexible cutting element positioned adjacent each of the transverse planes formed by the juncture of said sections comprising a base structure, a perforated rotatable drum mounted on said structure with its rotational axis vertically disposed, said drum being compartmented and positioned to support vertically at least one of said containers, a laterally movable frame mounted on said base structure, upper and lower stirrups mounted on said frame and projecting into said perforated drum positioned to engage and support releasably at least one section of said container, a movable hook member mounted on said frame adapted to enter said perforated drum to engage the flexible cutting element associated with the lowest section of said container for severing said material, a stripping member mounted on said frame projecting into said perforated drum and positioned between said stirrups to engage and separate forcibly said lowest section of said container with said severed material therein from the remaining sections of said container thereabove, a pair of contractable expandable clam shells mounted on said frame and extending under a portion of said drum, said clam shells being positioned to receive and support when contracted said separated lowest section of said container with said severed material therein, at least one heating unit disposed on said clam shells positioned to transmit heat through said separated lowest section of said container for causing discharge of said material therein, means mounted on said frame for subsequently expanding said clam shells for expelling said separated lowest section of said container, and means mounted on said base structure for receiving and removing said discharged material.

7. A dispenser mechanism for dispensing material of a semi-solid consistency contained in a multi-sectioned packing container having a transversely disposed flexible cutting element positioned adjacent each of the transverse planes formed by the juncture of said sections comprising a base structure, a perforated rotatable drum mounted on said structure with its axis vertically disposed, said drum being compartmented and positioned to support vertically at least one of said containers, a laterally movable frame mounted on said base structure, upper and lower stirrups mounted on said frame and projecting into said drum positioned to engage and support at least one section of said container, a movable hook member mounted on said frame adapted to enter said perforated drum to engage the flexible cutting element associated with the lowest section of said container for severing said material, a stripping member mounted on said frame projecting into said perforated drum and positioned between said stirrups to separate forcibly said lowest section of said container with said severed material therein from the remaining sections of said container thereabove, a pair of retractable expandable clam shells mounted on said frame and extending under a portion of said drums, said clam shells being positioned to receive and support temporarily when contracted said separated lowest section of said container with said severed material therein, a source of heat disposed on said clam shells positioned to transmit heat through said separated lowest section of said container for causing discharge of said material therein, a cam and associated follower element mounted on said frame positioned for alternately contracting and expanding said clam shells for selectively supporting and expelling respectively said separated lowest section of said container, and means mounted on said base structure for receiving and removing said discharged material.

8. A dispenser mechanism for dispensing material of a semi-solid consistency contained in a multi-sectioned packing container having a transversely disposed flexible cutting element positioned adjacent each of the transverse planes formed by the juncture of said sections comprising a base structure, a perforated rotatable drum mounted on said structure with its axis vertically disposed, said drum being compartmented and positioned to support at least one of said containers, a laterally movable frame mounted on said base structure, upper and lower stirrups mounted on said frame and projecting into said drum positioned to engage and support at least one section of said container, a movable hook member mounted on said frame adapted to enter said drum to engage the flexible cutting element associated with the lowest section of said container for severing said material, a stripping member mounted on said frame projecting into said drum and positioned between said stirrups to separate forcibly said lowest section of said container with said severed material therein from the remaining sections of said container thereabove, a pair of contractable expandable clam shells mounted on said frame and extending under a portion of said drum, said clam shells being positioned to receive and support temporarily when contracted said separated lowest section of said container with said severed material therein, a source of heat disposed on said clam shells positioned to transmit heat through said separated lowest section of said container for causing discharge of said material therein, a cam and associated follower element mounted on said frame for alternately contracting and expanding said clam shells for selectively supporting and expelling respectively said separated lowest section of said container, and a conveyor having at least one receptacle mounted on said base structure positioned to receive and remove said discharged material.

9. A dispenser mechanism for dispensing material of a semi-solid consistency contained in a multi-sectioned packing container having a transversely disposed cutting element positioned adjacent each of the transverse planes formed by the juncture of said sections comprising a base structure, a perforated rotatable drum mounted on said structure with its axis vertically disposed, said drum being compartmented and positioned to support at least one of said containers, a laterally movable frame mounted on said base structure, a driven shaft journalled to said frame, a source of power adapted to drive said driven shaft, upper and lower stirrups mounted on said frame and projectable into said drum, said stirrups being positioned to engage releasably for supporting at least one section of said container, a first cam having three stages mounted on said driven shaft, a first follower element mounted on said frame operably engaged with said first cam, said first follower element being operably connected to said upper and lower stirrups, said first cam being adapted to cause contraction of said upper stirrup for engaging said container and simultaneously cause expansion of said lower stirrup for releasing said container when said first follower element is in engaging relation with the first stage of said first cam, said first cam being adapted to cause contraction of both upper and lower stirrups for engaging said container when said first follower element is in engaging relation with the second stage of said first cam, said first cam being adapted to cause contraction of said lower stirrup for engaging said container and simultaneously cause expansion of said upper stirrup for releasing said container when said first follower element is in engaging relation with the third stage of said first cam, a movable hook member mounted on said frame adapted to enter said drum to engage the said cutting element associated with the lowest section of said container in said compartment for severing said material, a stripping member mounted on said frame and projectable into said drum, said stripping member being positioned between said stirrups and operable to separate forcibly said lowest section of said container with said severed material therein from the remaining sections of said container thereabove, a pair of contractable expandable clam shells mounted on said frame and extending under a portion of said drum, said clam shells being positioned to receive and support temporarily when contracted said separated lowest section of said container with said severed material therein, a source of heat disposed on said clam shells positioned to transmit heat through said separated lowest section of said container for causing discharge of said severed material therein, a second cam having two stages mounted on said driven shaft, a second follower element mounted on said frame and operably associated with said second cam, said second follower element being operably connected to contract said clam shells when said second follower element is in engaging relation with the first stage of said second cam, said second follower element being operably connected to expand said clam shells when said second follower element is in engaging relation with the second stage of said second cam, said clam shells being operable for releasably supporting said separated lowest section of said container, and a conveyor having at least one receptacle mounted on said base structure positioned to receive and remove said discharged material.

10. A dispenser mechanism for dispensing material of a semi-solid consistency contained in a multi-sectioned packing container having a transversely disposed cutting element positioned adjacent each of the transverse planes formed by the juncture of said sections comprising a base structure, a perforated rotatable drum mounted on said structure with its axis vertically disposed, said drum being compartmented and positioned to support at least one of said containers, a laterally movable frame mounted on said base structure, a driven shaft journalled to said frame, a source of power adapted to drive said driven shaft, upper and lower stirrups mounted on said frame projectable into said drum, said stirrups being positioned to engage releasably at least one section of said container, a first cam having three stages mounted on said driven shaft, a first follower element mounted on said frame operably engaged with said first cam, said first follower element being operably connected to said upper and lower stirrups, said first cam being adapted to cause contraction of said upper stirrup for engaging said container in supporting relation and simultaneously cause expansion of said lower stirrup for releasing said container when said first follower element is in engaging relation with the first stage of said first cam, said first cam being adapted to cause contraction of both upper and lower stirrups for engaging said container in supporting relation when said first follower element is in engaging relation with the second stage of said first cam, said first cam being adapted to cause contraction of said lower stirrup for engaging said container in supporting relation and simultaneously cause expansion of said upper stirrup for releasing said container when said first follower element is in engaging relation with the third stage of said first cam, a movable hook member mounted on said frame adapted to enter said drum to engage said cutting element associated with the lowest section of said container for severing said material, said hook member being operably connected to said driven shaft and positioned to engage said flexible cutting element when said first follower element is engaged with said second and third stages of said first cam, a stripping member mounted on said frame projectable into said drum and positioned between said stirrups operable to separate forcibly said lowest section of said container with said severed material therein from the remaining sections of said container thereabove, said stripping member being operably connected to said lower stirrup so that forcible separation of said lowest section of said container occurs simultaneously with the expansion of said lower stirrup, a pair of contractable expandable clam shells mounted on said frame and extending under a portion of said drum, said clam shells being positioned to receive and support when contracted said separated lowest section of said container with said severed material therein, a source of heat disposed on said clam shells positioned to transmit heat through said separated lowest section of said container for causing discharge of said severed material therein, a second cam having two stages mounted on said driven shaft, a second follower element mounted on said frame operably engaged with said second cam, said second follower element being operably connected to contract said clam shells when said second follower element is in engaging relation with the first stage of said second cam, said second follower element being operably connected to expand said clam shells when said second follower element is in engaging relation with the second stage of said second cam, said clam shells being operable for releasably supporting said separated lowest section of said container, and a conveyor having at least one receptacle mounted on said base structure positioned to receive and remove said discharged material.

11. A dispenser mechanism for dispensing material of a semi-solid consistency contained in a multi-sectioned packing container having a transversely disposed cutting element positioned adjacent each of the transverse planes formed by the juncture of said sections comprising a base structure, a perforated rotatable drum mounted on said structure with its axis vertically disposed, said drum being compartmented and positioned to support at least one of said containers, a locking device mounted on said base structure positioned for securing said drum in indexed relation with respect to said base structure, a laterally movable frame mounted on said base structure, said movable frame being lockable in a fixed position with respect to said base structure, a driven shaft journalled to said frame, a source of power adapted to drive said driven shaft, upper and lower stirrups mounted on said frame projectable into said drum, said stirrups being positioned to engage releasably at least one section of said container, a first cam having three stages mounted on said driven shaft, a first follower element mounted on said frame operably engaged with said first cam, said follower element being operably connected to said upper and lower stirrups, said first cam being adapted to cause contraction of said upper stirrup for engaging said container in supporting relation and simultaneously cause expansion of said lower stirrup for releasing said container when said first follower element is in engaging relation with the first stage of said first cam, said first cam being adapted to cause contraction of both upper and lower stirrups for engaging said container in supporting relation when said first follower element is in engaging relation with the second stage of said first cam, said first cam being adapted to cause contraction of said lower stirrup for engaging said container in supporting relation and simultaneously cause expansion of said upper stirrup for releasing said container when said first follower element is in engaging relation with the third stage of said first cam, a movable hook member mounted on said frame adapted to enter said drum to engage said cutting element associated with the lowest section of said container for severing said material, said hook member being operably connected to said driven shaft and positioned to engage said flexible cutting element when said first follower element is engaged with said second and third stages of said first cam, a stripping member mounted on said frame projectable into said drum and positioned between said stirrups operable to separate forcibly said lowest section of said container with said severed material therein from the remaining sections of said container thereabove, said stripping member being operably connected to said lower stirrup so that forcible separation of said lowest section of said container occurs simultaneously with the expansion of said lower stirrup, a pair of contractable expandable clam shells mounted on said frame and extending under a portion of said drum, said clam shells being positioned to receive and support when contracted said separated lowest section of said container with said severed material therein, a source of heat disposed on said clam shells positioned to transmit heat through said separated section of said container for causing discharge of said severed material therein, a second cam having two stages mounted on said driven shaft, a second follower element mounted on said frame operably engaged with said second cam, said second follower element being operably connected to contract said clam shells when said second follower element is in engaging relation with the first stage of said second cam, said second follower element being operably connected to expand said clam shells when said second follower element is in engaging relation with the second stage of said second cam, said clam shells being operable for releasably supporting said separated lowest section of said container, and a conveyor having at least one receptacle mounted on said base structure positioned to receive and remove said discharged material.

12. An ice cream dispenser mechanism for dispensing ice cream contained in a multi-sectioned packing container having a transversely disposed flexible cutting element positioned adjacent each of the transverse planes formed by the junctures of said sections comprising a base structure, a magazine mounted on said base structure positioned to support vertically at least one of said containers, means supported by said base structure for engaging one of said cutting elements for severing said ice cream in said container while supporting said container, means supported by said base structure for separating a lower section of said container with said severed ice cream therein while supporting the remaining upper sections of said container, and means for receiving said separated section of said container for discharging the severed ice cream therefrom and subsequently expelling said separated section of said container.

13. An ice cream dispenser mechanism for dispensing ice cream contained in a multi-sectioned packing container having a transversely disposed flexible cutting element positioned adjacent each of the transverse planes formed by the junctures of said sections comprising a base structure, a magazine mounted on said base structure positioned to support vertically at least one of said containers, an ejection apparatus mounted on said base structure, upper and lower stirrups disposed on said ejection apparatus positioned to engage and support at least one section of said container in said magazine, a movable hook member positioned on said ejection apparatus adapted to engage one of said flexible cutting elements for severing said ice cream in said container, a stripping member disposed on said ejection apparatus operable to separate a lower section of said container with said severed ice cream therein from the remaining sections thereabove, a contractable expandable means positioned on said ejection apparatus to receive and support temporarily said separated lower section of said container with said severed ice cream therein, means disposed on said ejection apparatus adapted to discharge said ice cream from said separated lower section of said container, said contractable expandable means being operable for subsequently expelling said separated sections, and intermittently movable conveyor means mounted on said base structure positioned for receiving and removing said discharged ice cream.

14. An ice cream dispenser mechanism for dispensing ice cream contained in a multi-sectioned packing container having a transversely disposed flexible cutting element positioned adjacent each of the transverse planes formed by the juncture of said sections comprising a base structure, a magazine mounted on said base structure positioned to support vertically at least one of said containers, an ejection apparatus mounted on said base structure, upper and lower stirrups disposed on said ejection apparatus positioned to engage supportingly at least one section of said container in said magazine, a movable hook member positioned on said ejection apparatus adapted to engage one of said flexible cutting elements for severing said ice cream in said container, a stripping member disposed on said ejection apparatus operable to separate a lower section of said container with said severed ice cream therein from the remaining sections thereabove, a pair of contractable expandable clam shells disposed on said ejection apparatus and extending under a portion of said magazine, said clam shells being positioned to receive and support when contracted said separated lowest section of said container with said severed ice cream therein, at least one heating unit disposed on said clam shells positioned to transmit heat through said separated lowest section of said container for causing discharge of said ice cream therein, means disposed on said ejection apparatus for subsequently expanding said clam shells for expelling said separated lowest section of said container, and intermittently movable conveyor means mounted on said base structure for receiving and removing said discharged ice cream.

15. An ice cream dispenser mechanism for dispensing ice cream contained in a multi-sectioned packing container having a transversely disposed flexible cutting element positioned adjacent each of the transverse planes formed by the juncture of said sections comprising a base structure, a magazine mounted on said base structure positioned to support vertically at least one of said containers, an ejection apparatus mounted on said base structure, upper and lower stirrups disposed on said ejection apparatus positioned to engage supportingly at least one section of said container in said magazine, a movable hook member positioned on said ejection apparatus adapted to engage one of said flexible cutting elements for severing said ice cream in said container, a stripping member disposed on said ejection apparatus operable to separate a lower section of said container with said severed ice cream therein from the remaining sections thereabove, a pair of contractable expandable clam shells disposed on said ejection apparatus and extending under a portion of said magazine, said clam shells being positioned to receive and support when contracted said separated lowest section of said container with said severed ice cream therein, at least one heating unit disposed on said clam shells positioned to transmit heat through said separated lowest section of said container for causing discharge of said ice cream therein, means disposed on said ejection apparatus for subsequently expanding said clam shells for expelling said separated lowest section of said container, intermittently movable conveyor means mounted on said base structure adapted for receiving and removing said discharged ice cream, and a forming device mounted on said base structure adapted to reform said ice cream on said conveyor receptacle into a substantially hemispherical shape.

16. An ice cream dispenser mechanism for dispensing ice cream contained in a multi-sectioned packing container having a transversely disposed cutting element positioned adjacent each of the transverse planes formed by the juncture of said sections comprising a base structure, a magazine mounted on said base structure positioned to support vertically at least one of said containers, an ejection apparatus mounted on said base structure, a driven shaft positioned on said ejection apparatus, a source of power adapted to drive said driven shaft, upper and lower stirrups disposed on said ejection apparatus projecting into said magazine, said stirrups being operable to engage releasably at least one section of said container, a first cam having three stages disposed on said driven shaft, a first follower element positioned on said ejection apparatus operable with said first cam, said follower element being operably connected to said upper and lower stirrups, said first cam being adapted to cause contraction of said upper stirrup for engaging said container in supporting relation and simultaneously cause expansion of said lower stirrup for releasing said container when said first follower element is in engaging relation with the first stage of said first cam, said first cam being adapted to cause contraction of both upper and lower stirrups for engaging said container in supporting relation when said first follower element is in engaging relation with the second stage of said first cam, said first cam being adapted to cause contraction of said lower stirrup for engaging said container in supporting relation and simultaneously cause expansion of said upper stirrup for releasing said container when said first follower element is in engaging relation with the third stage of said first cam, a movable hook member disposed on said ejection apparatus adapted to enter said magazine to engage said cutting element associated with the lowest section of said container for severing said ice cream, said hook member being operably connected to said driven shaft and positioned to engage said flexible cutting element when said first follower element is engaged with said second and third stages of said first cam, a stripping member disposed on said ejection apparatus projecting into said magazine and positioned between said stirrups operable to separate forcibly said lowest section of said container with said severed ice cream therein from the remaining sections of said container thereabove, said stripping member being operably connected to said lower stirrup so that forcible separation of said lowest section of said container occurs simultaneously with the expansion of said lower stirrup, a pair of contractable expandable clam shells disposed on said ejection apparatus and extending under a portion of said magazine, said clam shells being positioned to receive and support when contracted said separated lowest section of said container with said severed ice cream therein, a source of heat disposed on said clam shells positioned to transmit heat through said separated section of said container for causing discharge of severed ice cream therein, a second cam having two stages disposed on said driven shaft, a second follower element positioned on said ejection apparatus operably engaged with said second cam, said second follower element being operably connected to contract said clam shells when said second follower element is in engaging relation with the first stage of said second cam, said second follower element being operably connected to expand said clam shells when said second follower element is in engaging relation with the second stage of said second cam for expelling said separated section, said clam shells being operable for releasably supporting said separated lowest section of said container, and a conveyor having at least one receptacle mounted on said base structure positioned to receive and remove said discharged material.

17. An ice cream dispensing mechanism for dispensing ice cream according to claim 16 having a forming device mounted on said base structure operable to reform said ice cream on said conveyor receptacle into a substantially hemispherical shape.

References Cited in the file of this patent
UNITED STATES PATENTS

| | | |
|---|---|---|
| 1,197,211 | Kennedy | Sept. 5, 1916 |
| 1,289,907 | Proper | Dec. 31, 1918 |
| 1,395,654 | Porz | Nov. 1, 1921 |
| 1,577,241 | Ajouelo et al. | Mar. 16, 1926 |
| 1,933,403 | Wilson | Oct. 31, 1933 |
| 2,228,974 | Portwood | Jan. 14, 1941 |